US012571466B2

(12) United States Patent
Székely

(10) Patent No.: US 12,571,466 B2
(45) Date of Patent: Mar. 10, 2026

(54) DRIVE DEVICE FOR A MOTOR VEHICLE HAVING AN OPERATING MEDIUM TANK FORMED IN A MACHINE HOUSING

(71) Applicant: AUDI AG, Ingolstadt (DE)

(72) Inventor: Béla Székely, Györ (HU)

(73) Assignee: AUDI AG, Ingolstadt (DE)

( * ) Notice: Subject to any disclaimer, the term of this patent is extended or adjusted under 35 U.S.C. 154(b) by 102 days.

(21) Appl. No.: 18/697,151

(22) PCT Filed: Sep. 28, 2022

(86) PCT No.: PCT/EP2022/076994
§ 371 (c)(1),
(2) Date: Mar. 29, 2024

(87) PCT Pub. No.: WO2023/052431
PCT Pub. Date: Apr. 6, 2023

(65) Prior Publication Data
US 2025/0003479 A1      Jan. 2, 2025

(30) Foreign Application Priority Data

Sep. 29, 2021    (DE) ......................... 102021125200.8

(51) Int. Cl.
*F16H 57/021*          (2012.01)
*F16H 57/04*           (2010.01)
(52) U.S. Cl.
CPC ....... *F16H 57/021* (2013.01); *F16H 57/0453* (2013.01); *F16H 2057/0216* (2013.01)

(58) Field of Classification Search
CPC ......... F16H 57/0453; F16H 2057/0216; F16H 57/045
See application file for complete search history.

(56) References Cited

U.S. PATENT DOCUMENTS

| | | | | |
|---|---|---|---|---|
| 10,451,171 | B1 * | 10/2019 | Langenfeld | ........... F16H 57/045 |
| 10,746,282 | B2 | 8/2020 | Ito et al. | |
| 11,054,018 | B2 | 7/2021 | Hori | |
| 11,181,181 | B1 * | 11/2021 | Zhou | ................... F16H 57/0413 |
| 2002/0053489 | A1 * | 5/2002 | Schnitzer | ................. F01M 1/02 184/6.12 |

(Continued)

FOREIGN PATENT DOCUMENTS

| | | |
|---|---|---|
| CN | 105398288 A | 3/2016 |
| DE | 4414164 A1 | 10/1995 |

(Continued)

OTHER PUBLICATIONS

Examination Report issued on May 12, 2022, in corresponding German Application No. 102021125200.8, 10 pages.

(Continued)

*Primary Examiner* — Daniel D Yabut
(74) *Attorney, Agent, or Firm* — Maier & Maier, PLLC

(57)          ABSTRACT
A drive device for a motor vehicle. A machine housing in which an operating material consumer, and operating material tank, and an operating material pump are arranged. An air space is provided in the machine housing, into which at least one machine shaft of the drive device protrudes and which is separated by a partition wall from the operating material tank formed adjacent to the air space in the machine housing.

10 Claims, 2 Drawing Sheets

(56)      References Cited

U.S. PATENT DOCUMENTS

| | | | |
|---|---|---|---|
| 2011/0319213 A1 | 12/2011 | Ekonen et al. | |
| 2013/0274054 A1* | 10/2013 | Barillot .............. | F16H 57/0471 |
| | | | 475/160 |
| 2016/0341301 A1* | 11/2016 | Slesinski ............ | F16H 57/0402 |
| 2018/0363762 A1 | 12/2018 | Kiyokami et al. | |
| 2022/0412450 A1* | 12/2022 | Diwakar ................ | B60B 35/16 |

FOREIGN PATENT DOCUMENTS

| | | | | |
|---|---|---|---|---|
| DE | 102004026039 A1 | 12/2005 | | |
| DE | 102006022964 A1 | 11/2007 | | |
| DE | 102015016636 A1 | 6/2016 | | |
| DE | 102015219431 A1 | 4/2017 | | |
| DE | 102016215184 A1 | 2/2018 | | |
| DE | 102019128957 A1 | 4/2021 | | |
| GB | 2282646 A * | 4/1995 | ......... | F16H 57/0447 |
| JP | 2014190528 A | 10/2014 | | |
| JP | 202091001 A | 6/2020 | | |
| WO | 2018061443 A1 | 4/2018 | | |

OTHER PUBLICATIONS

International Preliminary Report on Patentability issued on Sep. 14, 2023, in corresponding International Application No. PCT/EP2022/076994, 20 pages.

International Search Report and Written Opinion issued on Dec. 9, 2022, in corresponding International Application No. PCT/EP2022/076994, 28 pages.

\* cited by examiner

DRIVE DEVICE FOR A MOTOR VEHICLE HAVING AN OPERATING MEDIUM TANK FORMED IN A MACHINE HOUSING

FIELD

The invention relates to a drive device for a motor vehicle.

BACKGROUND

Document DE 10 2016 215 184 A1 is known from the prior art, for example. This describes a transmission for a motor vehicle, having a hydraulic transmission controller, a transmission housing, an oil pan attached to the transmission housing, and a power electronics unit, which is supported on the transmission housing and/or the oil pan. It is provided in this case that the hydraulic transmission control unit and the power electronics unit are arranged tangentially and/or axially adjacent to one another at least in some sections with respect to a transmission center axis.

SUMMARY

It is the object of the invention to propose a drive device for a motor vehicle, which has advantages over known drive devices, in particular enables cost-effective and rapid production and is moreover constructed particularly compactly.

This is achieved according to the invention by a drive device for a motor vehicle. A machine housing is provided here, in which an operating material consumer, and operating material tank, and an operating material pump are arranged, wherein an air space is present in the machine housing, into which at least one machine shaft of the drive device protrudes and which is separated by means of a partition wall from the operating material tank formed adjacent to the air space in the machine housing.

The drive device is used to drive the motor vehicle, insofar thus to provide a drive toward directed to driving the motor vehicle. The drive device preferably has a drive assembly for this purpose, which is at least partially coupled with respect to drive to at least one wheel of the motor vehicle. The drive assembly is preferably at least partially arranged in the machine housing or accommodated by the machine housing. For example, the drive assembly is provided in the form of an electric machine, which is operated at least sometimes as an electric motor.

The operating material consumer, the operating material tank, and the operating material pump are arranged in the machine housing. The operating material is to be understood as a material used for operating the drive device, which is preferably present at least sometimes or—particularly preferably—permanently in liquid form. The operating material is in particular a lubricant. In this case, the operating material consumer can also be designated as a lubricant consumer, the operating material tank as a lubricant tank, and operating material pump as a lubricant pump. Alternatively, the operating material is a coolant. The operating material consumer, the operating material tank, and the operating material pump can then accordingly also be called a coolant consumer, coolant tank, and coolant pump.

For example, the operating material consumer is provided in the form of the drive assembly and/or a transmission. During operation of the drive device, operating material is supplied at least sometimes to the operating material consumer. The operating material is used for lubrication and/or temperature control of the operating material consumer. The term "operating material consumer" is not to be understood to mean that the operating material consumer actually consumes the operating material. Rather, the operating material consumer accepts the operating material, in particular at an operating material inlet, and thereafter it provides it again, at least in large part, preferably at an operating material outlet.

The operating material supplied to the operating material consumer is removed from the operating material tank, which is insofar provided and designed for temporarily storing the operating material. The operating material is supplied again to the operating material tank after it is supplied to the operating material consumer, namely with the aid of the operating material pump. This means that the operating material pump is provided and designed for conveying the operating material provided by the operating material consumer in the direction of the operating material tank or into it.

Preferably, at least one further operating material pump is provided, by means of which the operating material is removed from the operating material tank and conveyed in the direction of the operating material consumer or is supplied to the operating material consumer. For example, in this case the operating material pump and the further operating material pump are operable independently of one another, so that by means of the operating material pump, the operating material can be supplied to the operating material tank and with the aid of the further operating material pump, it can be removed from the operating material tank and conveyed in the direction of the operating material consumer. However, the operating material pump and the further operating material pump are preferably operated jointly. In particular, they are driven by a joint drive.

To achieve a particularly compact design of the drive device and moreover be able to produce it easily and cost-effectively, the operating material tank is formed in the machine housing; therefore, there is no separate operating material tank provided outside the machine housing. The operating material tank is moreover completely arranged in the machine housing. The operating material tank is provided adjacent to the air space into which the at least one machine shaft of the drive device protrudes.

The machine housing has a base body, on which a machine housing cover for closing the air space and the operating material tank is arranged and/or fastens. The air space and the operating material tank are insofar each delimited, on the one hand, by a wall of the base body and, on the other hand, by the machine housing cover arranged or fastened on the base body. The air space is enclosed at least in some areas by the machine housing. The air space is particularly preferably closed fluid-tight in relation to an external environment. The machine housing cover is preferably fastened in a fluid-tight manner on the base body for this purpose, so that the air space is delimited, on the one hand, by the base body or its wall and, on the other hand, by the machine housing cover, in particular in the axial direction of the machine shaft.

The partition wall is arranged between the air space and the operating material tank in order to fluidically separate the operating material tank and the air space at least in some areas. The partition wall preferably originates from the base body or its wall and extends from it, in particular in the direction of the machine housing cover. The partition wall particularly preferably presses in a fluid-tight manner against the machine housing cover after the installation of the machine housing cover on the base body, in order to fluidically separate the air space and the operating material tank from one another.

The machine shaft of the drive device is present at least in some areas in the air space. The machine shaft is, for example, part of the drive assembly, in particular it represents a driveshaft of the drive assembly. For example, the machine shaft has teeth in the air space, via which it is coupled with at least one other shaft of the drive device with respect to drive. For example, the teeth are used for fixing a gear wheel with respect to the machine shaft in the circumferential direction. For this purpose, the gear wheel has counter teeth, which interact in a formfitting manner with the teeth of the machine shaft.

The machine shaft preferably protrudes through the wall of the base body into the air space, in particular the machine shaft is rotatably mounted on the wall. A bearing recess is preferably provided in the wall in this case, through which the machine shaft extends. A bearing is also arranged in the bearing recess, by means of which the machine shaft is rotatably mounted on the wall. The bearing is provided in particular as a plain bearing or as a roller bearing.

It can be provided that a volume capacity of the operating material tank is equal to or at least approximately equal to a volume capacity of the air space. The volume capacity of the operating material tank preferably corresponds, however, to at least 20%, at least 30%, at least 40%, or at least 50% of the volume capacity of the air space. A sufficient size of the operating material tank is achieved in this way.

One refinement of the invention provides that the operating material pump is fluidically connected on the suction side via a suction channel to the operating material consumer and on the pressure side via a pressure channel to the operating material tank and the operating material tank is fluidically connected via a flow channel to the operating material consumer, wherein the suction channel, the pressure channel, and the flow channel are each formed opened in a base body of the machine housing while forming an opening and the openings are covered fluidically separately from one another by means of an end cover fastened on the base body.

For example, it is provided that the operating material pump is connected, on the one hand, via the suction channel to the operating material consumer. This means that the operating material pump conveys the operating material from the operating material consumer or its operating material outlet in the direction of the operating material tank via the suction channel. On the other hand, the operating material pump is preferably connected via the pressure channel to the operating material tank. The operating material pump insofar aspirates the operating material from the direction of the operating material consumer via the suction channel and conveys it via the pressure channel in the direction of the operating material tank or into it.

Both the suction channel and the pressure channel are preferably directly connected to the operating material pump, thus extend in the flow direction originating therefrom. It can also be provided that the suction channel extends up to the operating material outlet of the operating material consumer and the pressure channel extends up to the operating material tank. However, the suction channel is preferably arranged spaced apart from the operating material outlet and the pressure channel is arranged spaced apart from the operating material tank, so that they only extend partially up to the respective element.

It can be provided that the operating material tank and the operating material consumer are fluidically connected to one another via a flow channel. The flow channel is thus provided along a fluidic connection between the operating material tank and the operating material consumer. It can be provided that the flow channel originates directly from the operating material tank and extends up to the operating material consumer. However, it can also be provided that the flow channel is fluidically spaced apart from the operating material tank or the operating material consumer or from both, thus only forms a part of the flow connection.

In an optional design of the drive device, the suction channel, the pressure channel, and the flow channel are each formed at least in some areas in the machine housing. A corresponding recess is thus provided for each of the channels in the machine housing, which is opened via the respective opening. The opening insofar represents an orifice opening, via which the respective channel or the respective recess initially opens into an external environment of the base body, namely as long as the end cover is not fastened on the base body, thus when the end cover is not fastened on the base body. In other words, the recesses are open in the direction of the end cover and have their respective opening there. The recesses in the machine housing, thus the suction channel, the pressure channel, and the flow channel, are preferably produced during a casting process of the machine housing. The machine housing is provided in this case as a cast part.

It can be provided that the recesses only form a part of the channels. For example, a section of the respective channel opens into the corresponding recess of the machine housing. It can be provided in particular that a first section of the one of the channels opens at a first point into the recess and a second section originates from the recess at a second point spaced apart from the first point, so that the two sections are fluidically connected to one another via the recess or have a flow connection to one another. The section or at least one of the sections of the respective channel is preferably also formed during the casting or is alternatively designed as a drilled hole.

It can be provided that the channels or the recesses are initially provided open in the machine housing. For this reason, the end cover is fastened on the base body, namely such that the openings are completely overlapped and thus covered or sealed closed. The channels are thus covered fluidically separately from one another by means of the end cover. This is to be understood in particular to mean that the channels do not have a flow connection to one another via their openings, but rather that such a flow connection is interrupted by the end cover.

The end cover is used for jointly covering or closing the openings, so that only a single element, namely the end cover, has to be fastened on the base body to complete the channels. It is therefore not necessary to attach and/or fasten different closure elements separately on the machine housing. This enables particularly rapid production of the drive device and also means a significant simplification of the assembly of the drive device.

The end cover particularly preferably has a screw connection to the machine housing, thus is fastened thereon by means of at least one screw or one bolt. A reliable and permanently sealed covering or closing of the openings with the aid of the end cover is implemented in this way. Overall, it is readily possible for the described drive device to at least partially form the channels initially in a particularly simple manner in the machine housing, in particular during a casting process, in which the machine housing is produced.

The end cover is then arranged on the base body and fastened thereon for jointly covering or closing the openings of the channels or the recesses. The multiple channels are insofar implemented or completed simultaneously by the arrangement of the end cover. The end cover thus delimits each of the channels at least in some areas or represents a flow-guiding element for the channels.

One refinement of the invention provides that an overflow opening is formed in the partition wall, via which the operating material tank is fluidically connected to the air space. The partition wall thus does not completely separate the air space from the operating material tank or vice versa, but rather in particular a fluidic connection is established between the operating material tank and the air space via the overflow opening. A pressure equalization between the operating material tank and the air space can take place in this way, so that a fillable change in the operating material tank is possible without a significant change of the pressure present therein.

The overflow opening is arranged in an upper half of the partition wall with the intended arrangement of the machine housing or the drive device. The overflow opening is preferably provided at an upper end of the partition wall. In particular, the overflow opening is arranged above an operating material level in the operating material tank with the intended arrangement of the drive device and with the intended fill level of the operating material tank, so that air can readily flow between the operating material tank and the air space, but the operating material located in the operating material tank is reliably held therein by the influence of gravity.

One refinement of the invention provides that at least a section of the overflow opening overlaps an area of the air space with the intended arrangement of the drive device. In other words, the overflow opening is arranged at least in some areas above the air space and accordingly also the operating material tank. The partition wall is appropriately designed and arranged for this purpose. Such an arrangement of the overflow opening enables reliable drainage of operating material into the air space if an overflow of operating material from the operating material tank into the air space through the overflow opening should nonetheless occur from time to time.

One refinement of the invention provides that the overflow opening is provided at least with a section in an area of the partition wall which is arranged inclined in the direction of the air space. The arrangement of the overflow opening overlapping the air space is thus implemented by the inclination of the partition wall or the area of the partition wall. With the intended arrangement of the drive device, the area of the partition wall is thus inclined viewed from bottom to top in the direction of the air space, so that the area of the partition wall engages more and more into the air space the farther upward it is provided. In relation to a vertical plane, the area of the partition wall is inclined, for example, by an angle of at least 15° and at most 75°, at least 30° and at most 60°, or approximately or exactly 45°. The above-described advantages are achieved in this way.

One refinement of the invention provides that the operating material tank is provided on opposite sides of the machine shaft viewed in cross section with respect to an axis of rotation of the machine shaft. An imaginary plane, for example, the above-mentioned vertical plane, which completely accommodates the axis of rotation of the machine shaft, thus intersects the operating material tank such that a part of its volume capacity is arranged on a first side of the plane and a second part of its volume capacity is arranged on a second side of the plane facing away from the first side of the plane.

The plane particularly preferably intersects the operating material tank at points spaced apart from one another, namely on opposite sides of the axis of rotation. For example, with intended arrangement of the drive device, in this case the operating material tank is provided both below and above the axis of rotation of the machine shaft. A sufficiently large volume capacity of the operating material tank is achieved in this way in spite of the protrusion of the machine shaft into the air space.

One refinement of the invention provides that the operating material tank encloses the machine shaft, viewed in cross section, around at least 180°, at least 195°, at least 210°, or at least 225°. The angle range over which the operating material tank extends with respect to the axis of rotation of the machine shaft extends from a first outermost end of the operating material tank to a second outermost end of the operating material tank. A particularly large volume capacity of the operating material tank is implemented by the enclosure around one of the mentioned values.

One refinement of the invention provides that, viewed in cross section, a width of the overflow opening in a horizontal direction with the intended arrangement of the drive device corresponds to at most 10%, at most 7.5%, at most 5%, or at most 2.5% of a maximum width of the operating material tank in the same direction over its entire height, and/or that, viewed in cross section, the width of the overflow opening in a horizontal direction with the intended arrangement of the drive device corresponds to at most 10%, at most 7.5%, at most 5%, or at most 2.5% of a height of the operating material tank present in a vertical direction perpendicular to the horizontal direction.

The width of the overflow opening is to be understood as its extension, viewed in cross section in the horizontal direction, with the intended arrangement of the drive device. The maximum width of the material tank describes its maximum dimensions in the same direction over its entire height, thus in the vertical direction perpendicular to the horizontal direction. By limiting the width of the overflow opening to one of the mentioned proportions of the maximum width of the operating material tank, a sufficiently small overflow opening is achieved to ensure a reliable pressure equalization between the operating material tank and the air space, but to prevent an undesired overflow of operating material from the operating material tank in the direction of the air space.

Additionally or alternatively, viewed in cross section, the width of the overflow opening corresponds to one of the mentioned proportions of the height of the operating material tank. The height is present in the vertical direction, which is perpendicular to the horizontal direction. This limiting of the width of the overflow opening is also used to implement the goal formulated above.

One refinement of the invention provides that the operating material consumer is fluidically connected via a flow channel, which discharges via a flow orifice opening into the operating material tank, and via an operating material sump to a return channel, which discharges via a return orifice opening into the operating material tank, wherein, viewed in cross section, the overflow opening is arranged on the side of the return orifice opening facing away from the flow orifice opening. The flow channel and the return channel are used for fluidically connecting the operating material consumer to the operating material tank.

Operating material is removed from the operating material tank and supplied to the operating material consumer via the flow channel, more precisely via its flow orifice opening. From the operating material consumer, the operating material reaches the operating material sump, from which it is conveyed via the return channel in the direction of the operating material tank. The operating material enters back into the operating material tank via the return orifice opening of the return channel. Both the flow orifice opening and the return orifice opening are insofar arranged in the operating material tank or at least discharge therein.

Viewed in cross section, the return orifice opening is now to be arranged between the overflow opening and the flow orifice opening, so that ultimately the overflow opening, with the intended arrangement of the drive device, is provided above the return orifice opening, which is in turn arranged above the flow orifice opening. A reliable provision of the operating material and an escape of the operating material from the operating material tank in the direction of the air space are reliably prevented in this way.

One refinement of the invention provides that the return channel extends through a passage recess formed in the partition wall. The passage recess is thus formed in the partition wall, in particular additionally to the overflow opening. The passage recess is used for the passage of the return channel from the air space into the operating material tank. The return channel is preferably arranged in a leak-tight manner in the passage recess, so that operating material can be introduced into the operating material tank through the return channel, but no operating material can pass through the passage recess from the operating material tank into the air space along the return channel. Such a design of the drive device enables a particularly compact construction.

One refinement of the invention provides that the air space, viewed in longitudinal section with respect to the axis of rotation of the machine shaft, is delimited, on the one hand, by a wall of the machine housing and, on the other hand, by a machine housing cover fastened on the machine housing, wherein—again viewed in longitudinal section—the wall of the machine housing and the machine housing cover are curved and/or angled in the same direction. The arrangement of the air space and—optionally—also the operating material tank between the wall of the machine housing or the base body of the machine housing and the machine housing cover was already mentioned. Both the wall and the machine housing cover are curved and/or angled viewed in longitudinal section. The curvature and/or the angle are in the same direction in this case. A compact and simultaneously extremely stable design of the drive device or its machine housing is achieved in this way.

One refinement of the invention provides that, viewed in longitudinal section, the machine housing cover extends in the radial direction from the outside inward farther in the direction facing away from the operating material tank than the wall of the machine housing, so that a distance between the machine housing cover and the wall of the machine housing increases in the radial direction from the outside inward. The curvature or angle of the wall and the machine housing cover is insofar implemented such that, viewed in longitudinal section, they run toward one another in the radial direction outward or their distance increases in the radial direction inward. A particularly large volume capacity of the operating material tank is achieved in this way.

One refinement of the invention provides that a disconnecting clutch is arranged on a side of the wall of the machine housing facing away from the air space, via which the machine shaft and/or a further machine shaft coupled with respect to drive to the machine shaft is connected with respect to drive to and output flange of the drive device. The machine shaft or the further machine shaft are preferably arranged completely in the machine housing, thus do not extend out of it. In contrast, the output flange is arranged outside the machine housing or is at least accessible from outside the machine housing. The drive device makes the drive torque generated thereby available at least sometimes via the output flange.

The machine shaft or the further machine shaft is connected with respect to drive to the output flange. The drive assembly is insofar at least sometimes coupled with respect to drive via the machine shaft and/or the further machine shaft with the output flange. The connection of the output flange to the machine shaft or the further machine shaft is provided via the disconnecting clutch.

In a first setting of the disconnecting clutch, the machine shaft or the further machine shaft is coupled with respect to drive to the output flange, in particular rigidly. In a second setting of the disconnecting clutch, in contrast, the machine shaft or the further machine shaft is decoupled with respect to drive from the output flange.

Due to the arrangement of the operating material tank in the machine housing, the operating material tank otherwise required outside the machine housing is dispensed with. This means that instead of this external operating material tank, an actuator can be arranged on the machine housing, by means of which the disconnecting clutch can be shifted. This means that the actuator is fastened on the outside of the machine housing, whereas the disconnecting clutch is located in the machine housing. The drive device is made even more compact in this way.

The features and combinations of features described in the description, in particular the features and combinations of features described in the following description of the figures and/or shown in the figures are usable not only in the respective specified combination, but also in other combinations or alone, without departing from the scope of the invention. Therefore, embodiments are also to be viewed as comprised by the invention which are not explicitly shown or explained in the description and/or the figures, but originate from the explained embodiments or are derivable therefrom.

BRIEF DESCRIPTION OF THE FIGURES

The invention will be explained in more detail hereinafter on the basis of the exemplary embodiments illustrated in the drawings, without the invention being restricted. In the figures.

DETAILED DESCRIPTION

Figure 1:
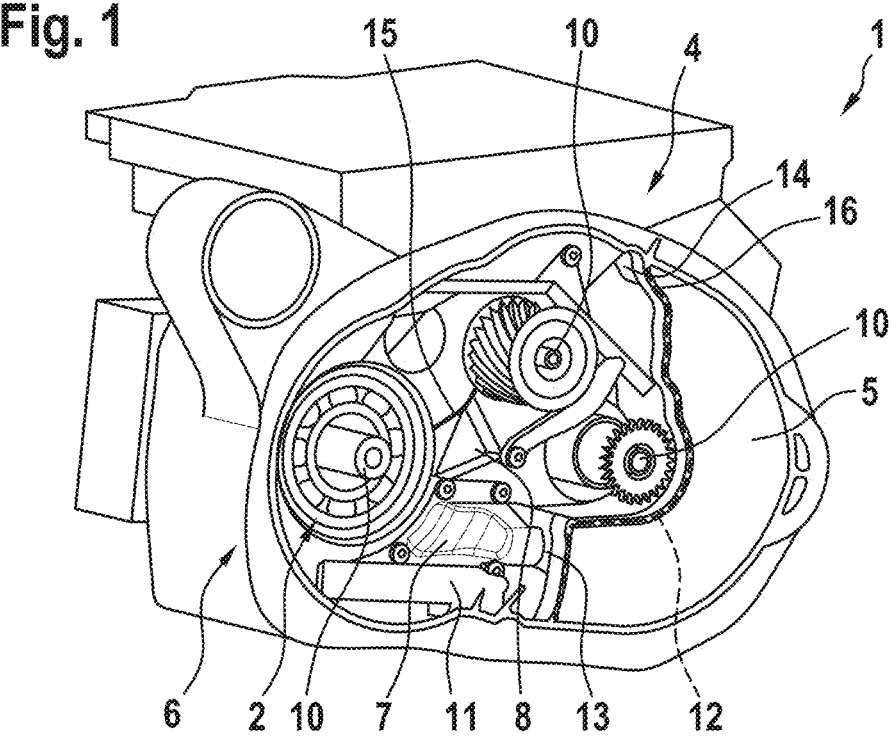
FIG. 1 shows a schematic representation of a drive device for a motor vehicle.

FIG. 1 shows a schematic representation of a drive device 1 for a motor vehicle (not shown in more detail). The drive device 1 has a drive assembly 2, which is provided in the exemplary embodiment shown here as an electric machine and accordingly has a stator and a rotor 4. Furthermore, the drive device 1 has a transmission (not shown in more detail), which has multiple transmission steps. The drive assembly 2 is preferably connected with respect to drive via the transmission to an output shaft of the drive device 1, preferably via a drive flange 3 (not visible here) of the drive device 1, wherein at least one wheel of the motor vehicle can in turn be coupled with respect to drive with the output shaft. Both the drive assembly 2 and the transmission are arranged in a machine housing 4 of the drive device 1.

During operation of the drive device 1, operating material for lubrication and/or for temperature control are supplied at least sometimes to the drive assembly 2 and the transmission. The drive assembly 2 and the transmission have corresponding operating material supply devices for this purpose. The drive assembly 2 and the transmission insofar represent operating material consumers. They are at least sometimes supplied operating material from an operating material tank 5. The operating material supplied to the operating material consumers exits after the lubrication and/or temperature control into an operating material sump and is conveyed again therefrom by means of an operating material pump in the direction of the operating material tank 5. In the scope of the exemplary embodiment described here, it is provided that the operating material is supplied to the drive assembly 2 by means of a first further operating material pump and is supplied to the transmission by means of a second further operating material pump.

The operating material pump is fluidically connected via a suction channel to the operating material sump and therefore to the operating material consumer, namely on the suction side. On the pressure side, the operating material pump is connected via a pressure channel and an operating material line to the operating material tank 5. Finally, a flow channel is provided, via which the operating material tank 5 is connected to the operating material consumer, namely via the further operating material pumps. In the exemplary embodiment shown here, it is provided that the operating material pump and the further operating material pumps are driven by means of a common drive, which can insofar also be designated as an operating material pump drive or oil pump drive. The drive has, for example, an electric motor or is designed as such.

It is provided that the suction channel, the further suction channel, the pressure channel, and the flow channel are each formed in a base body 6 of the machine housing 4, which can also be designated as the transmission housing, namely each with formation of an opening (not visible here). The openings of the mentioned channels are covered or closed fluidically separately from one another by means of an end cover 7 fastened on the base body 6, which is only indicated.

The base body 6 of the machine housing 4 partially encloses in air space 8, namely jointly with a machine housing cover 9 (not shown here), which is fastened on the base body 6. At least one machine shaft 10 engages in the air space 8, in the illustrated exemplary embodiment multiple machine shafts 10. A suction nozzle 11 is arranged on the end cover 7, which is fluidically connected via the end cover 7 to the further suction channel. The suction nozzle 11 protrudes in the direction of a bottom of the machine housing 4 into the air space 8, so that via the suction nozzle 11, operating material present in the air space 8 can be conveyed via the further suction channel, the operating material pump, the pressure channel, and the operating material line into the operating material tank 5. The operating material line can moreover also be designated as a return channel or return line.

The operating material tank 5 is formed separately from the air space 8 in the machine housing 4 and is separated from it by means of a partition wall 12. A passage recess 13, through which the operating material line engages in order to fluidically connect the pressure channel to the operating material tank 5, is formed in the partition wall. An overflow opening 14, via which the operating material tank 5 is fluidically connected to the air space 8, is formed in the partition wall. In the intended installation location of the drive device 1, the overflow opening 14 is arranged at a geodetic upper end of the partition wall 12 or at least in an upper half of the partition wall 12. Excess passage of operating material from the operating material tank 5 in the direction of the air space 8 is prevented in this way.

Both the operating material tank 5 and air space 8 are delimited in the axial direction with respect to an axis of rotation of the machine shaft 10, on the one hand, by a wall 15 of the base body 6 and, on the other hand, by the machine housing cover 9. The operating material tank 5 has a volume capacity which corresponds to at least 20%, at least 30%, at least 40%, or at least 50% of a volume content of the air space 8. The overflow opening 14 is moreover arranged such that it overlaps the air space 8 at least in some areas. In this way, an area 16 of the partition wall is arranged inclined, namely in particular such that it extends farther and farther into the air space 8 on top with the intended arrangement of the drive device 1.

Figure 2:
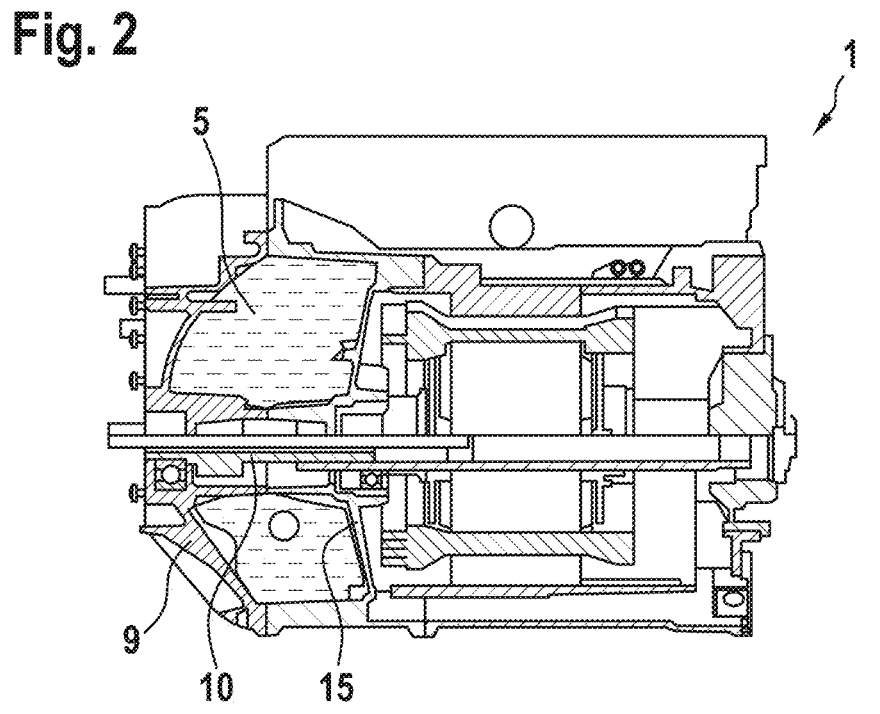
FIG. 2 shows a longitudinal sectional view through the drive device.

FIG. 2 shows a schematic longitudinal sectional view of the drive device 1. The operating material tank 5 can again be seen, which is delimited, on the one hand, by the wall 15 and, on the other hand, by the machine housing cover 9. It can be seen that the wall 15 and the machine housing cover 9 are curved or angled in the same direction. In this case, the distance between the wall 15 and the machine housing cover 9 is to increase in the radial direction from the outside inward with respect to the machine shaft 10 in the longitudinal section shown.

Figure 3:
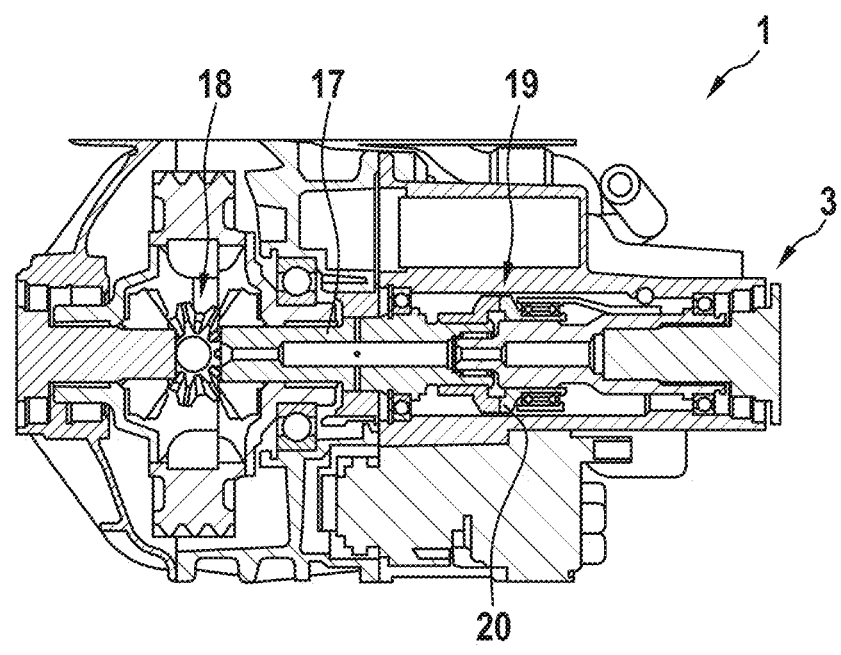
FIG. 3 shows a further longitudinal sectional view through the drive device.

FIG. 3 shows a further schematic longitudinal sectional view of the drive device 1. A further machine shaft 17 can be seen, which is coupled with respect to drive to the machine shaft 10, for example, via a differential gear 18. The further machine shaft 17 is connected with respect to drive to the output flange 3 of the drive device 1, namely via a disconnecting clutch 19. The disconnecting clutch 19 in the exemplary embodiment shown here has a displacement claw 20, wherein in a first position the displacement claw 20 rigidly couples the drive flange 3 with respect to drive to the further machine shaft 17 and in a second position it is decoupled therefrom with respect to drive.

The disconnecting clutch 19 is preferably accommodated completely in the machine housing 4. An actuator for actuating the disconnecting clutch 19, thus in particular for moving the displacement claw 20 between the first position and the second position, in contrast, is arranged outside the machine housing 4 and externally fastened thereon. This is possible by space which becomes free resulting due to the arrangement of the operating material tank 5 in the machine housing 4.

LIST OF REFERENCE SIGNS 1 drive device
2 drive assembly
3 output flange
4 machine housing
5 operating material tank
6 base body
7 end cover
8 air space
9 machine housing cover
10 machine shaft
11 suction nozzle
12 partition wall
13 passage recess
14 overflow opening
15 wall
16 area 17 further machine shaft
18 differential gear
19 disconnecting clutch
20 displacement claw

The invention claimed is:

1. A drive device for a motor vehicle, comprising:
a machine housing;
an operating material consumer arranged in the machine housing;
an operating material tank arranged in the machine housing;
an operating material pump arranged in the machine housing;
an air space provided in the machine housing, into which at least one machine shaft of the drive device protrudes; and
a partition wall separating the air space from the operating material tank formed adjacent to the air space in the machine housing,
wherein the operating material tank is only fluidically connected to the air space via an overflow opening formed in an upper portion of the partition wall,
wherein the air space, viewed in longitudinal section with respect to the axis of rotation of the machine shaft, is delimited, on the one hand, by a wall of the machine housing and, on the other hand, by a machine housing cover fastened on the machine housing, wherein, again viewed in longitudinal section, the wall of the machine housing and the machine housing cover are curved and/or angled in the same direction.

2. The drive device as claimed in claim 1, wherein the overflow opening is provided at least with one section in an area of the partition wall, which is arranged inclined in the direction of the air space.

3. The drive device as claimed in claim 2, wherein the operating material tank, viewed in cross section with respect to an axis of rotation of the machine shaft, is provided on opposite sides of the machine shaft.

4. The drive device as claimed in claim 2, wherein the operating material tank encloses the machine shaft, viewed in cross section, around at least 180°, at least 195°, at least 210°, or at least 225°.

5. The drive device as claimed in claim 2, wherein, viewed in cross section, the width of the overflow opening in a horizontal direction of the drive device corresponds to at most 10%, at most 7.5%, at most 5%, or at most 2.5% of a maximum width of the operating material tank in the same direction over its entire height, and/or, viewed in cross section, the width of the overflow opening in a horizontal direction of the drive device corresponds to at most 10%, at most 7.5%, at most 5%, or at most 2.5% of a height of the operating material tank provided in a vertical direction perpendicular to the horizontal direction.

6. The drive device as claimed in claim 1, wherein the operating material tank, viewed in cross section with respect to an axis of rotation of the machine shaft, is provided on opposite sides of the machine shaft.

7. The drive device as claimed in claim 6, wherein the operating material tank encloses the machine shaft, viewed in cross section, around at least 180°, at least 195°, at least 210°, or at least 225°.

8. The drive device as claimed in claim 1, wherein the operating material tank encloses the machine shaft, viewed in cross section, around at least 180°, at least 195°, at least 210°, or at least 225°.

9. The drive device as claimed in claim 1, wherein, viewed in cross section, the width of the overflow opening in a horizontal direction of the drive device corresponds to at most 10%, at most 7.5%, at most 5%, or at most 2.5% of a maximum width of the operating material tank in the same direction over its entire height, and/or, viewed in cross section, the width of the overflow opening in a horizontal direction of the drive device corresponds to at most 10%, at most 7.5%, at most 5%, or at most 2.5% of a height of the operating material tank provided in a vertical direction perpendicular to the horizontal direction.

10. The drive device as claimed in claim 1, wherein a disconnecting clutch is arranged on a side of a wall of the machine housing facing away from the air space, via which the machine shaft and/or a further machine shaft that is coupled to the machine shaft is further connected to an output flange of the drive device.

* * * * *